Patented Sept. 9, 1924.

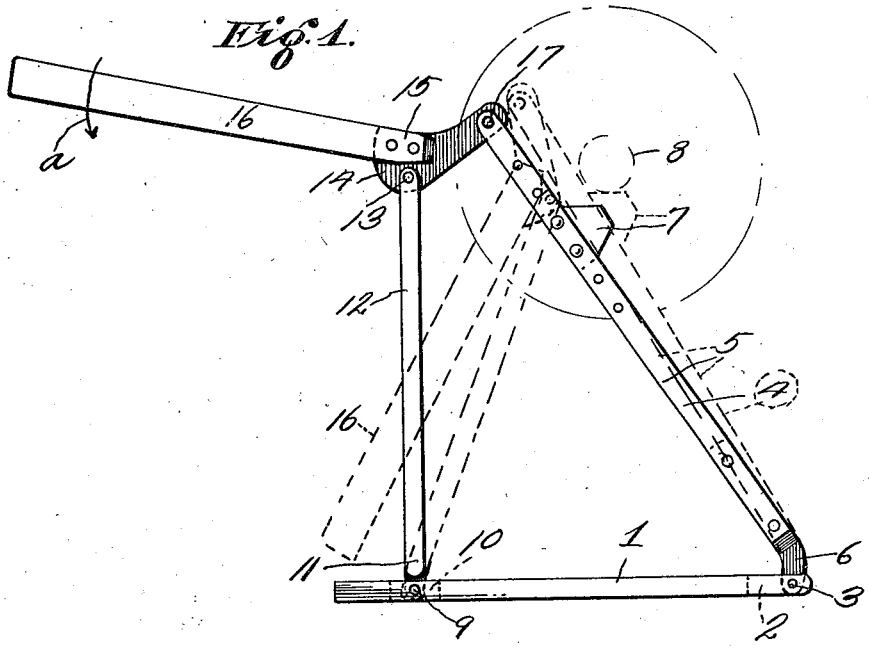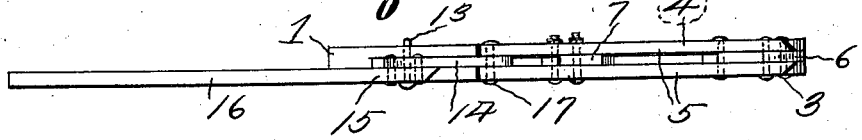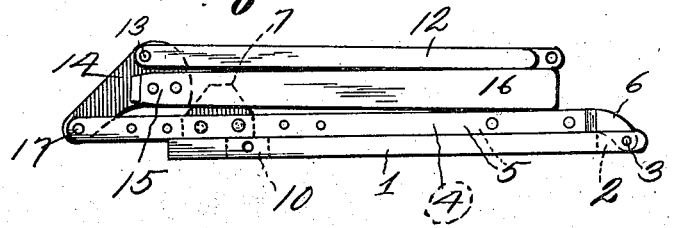

1,508,154

UNITED STATES PATENT OFFICE.

WILLIAM W. BELLAMY, OF OAKLAND, CALIFORNIA.

VEHICLE JACK.

Application filed April 24, 1924. Serial No. 708,746.

*To all whom it may concern:*

Be it known that I, WILLIAM W. BELLAMY, a citizen of the United States, residing at Oakland, in the county of Alameda, State of California, have invented a new and useful Vehicle Jack; and I do hereby declare the following to be a full, clear, and exact description of the invention, such as will enable others skilled in the art to which it appertains to make and use the same.

The invention relates to vehicle jacks, and has for its object to provide a device of this character which is simple in construction, may be easily and quickly placed under a vehicle axle, and the axle raised by a single movement of an operating lever. Also to construct the jack in a manner whereby it may be easily and quickly folded into a compact package for storage or shipping purposes, which is particularly advantageous where the jack is carried in an automobile.

A further object is to provide a vehicle jack comprising a base, to the forward end of which is pivotally connected an upwardly and rearwardly extending axle engaging member, and to the rear end of which is pivotally connected a vertically disposed bar, the upper end of which is pivotally connected to an operating lever at a point rearwardly spaced from the pivotal point of the upwardly and rearwardly extending member, whereby upon a downward movement of the operating lever, the upper end of the upwardly extending bar will move to a point beyond a line drawn between the lower pivotal point of the bar, and the upper pivotal point of the upwardly and rearwardly extending member.

A further object is to provide the upwardly and rearwardly extending member at its lower end with a curved portion pivoted to the base, and forming means whereby the upwardly and rearwardly extending member will fold onto the base.

A further object is to position the lever whereby when it is forced downwardly, the upper end thereof will engage the upper end of the upwardly extending bar, and will be limited in its inward movement, whereby the outer end of the operating lever will be spaced from the upwardly extending bar and allow the same to be easily grasped.

With the above and other objects in view the invention resides in the combination and arrangement of parts as hereinafter set forth, shown in the drawing, described and claimed, it being understood that changes in the precise embodiment of the invention may be made within the scope of what is claimed without departing from the spirit of the invention.

In the drawing:—

Figure 1 is a side elevation of the jack showing the same in position for use.

Figure 2 is a top plan view of the jack.

Figure 3 is a side elevation of the jack, showing the same in folded position for storage purposes.

Referring to the drawing, the numeral 1 designates the base of the jack, the forward end of which is bifurcated at 2, and in which bifurcation is pivotally connected at 3, an upwardly and rearwardly extending member 4, which member is formed from spaced bars 5. The lower end of the member 4 is provided with a curved arm 6, which is pivoted at 3 to the base 1, and the curve of said arm is sufficient to allow the upwardly and rearwardly extending member 4 to fold into close engagement with the upper side of the base 1 as clearly shown in Figure 3. Adjustably mounted between the bars 3 is an axle engaging block 7, which is adapted to engage under an axle 8 for raising the axle to the position shown in Figure 1, in dotted lines, upon a forward movement of the free end of the pivoted member 4.

Pivotally mounted on a transversely disposed pin 9, extending through the rear end of the base 1, and in a recess 10 therein is the lower end 11 of a substantially vertically disposed bar 12, the upper end of which is pivotally connected at 13 to one side of the lever plate 14, and beneath the inner end 15 of the operating lever 16, the purpose of which will presently appear. The plate 14 extends upwardly and forwardly at an angle to the operating lever 16, and has its forward end pivotally connected at 17 between the upper ends of the bars 5 of the upwardly and rearwardly extending member 4. By providing the angularly disposed plate it will be seen that when the handle lever 16 is forced downwardly in the direction of the arrow *a*, the pivotal point 13 will move through and beyond a line between the pivotal points 9 and 17 where the weight of a vehicle on the block 7 will hold the operating lever 16 in operative position as clearly shown in dotted lines in Figure 1. It will be noted by pivoting the upper end of the bar 12 below and adjacent the inner end of the operating handle 16, said inner end of the handle will engage the outer side of the upper end of the pivoted bar 12, and not only limit the inward movement of the handle 16, but at the same time maintain the other portions of said handle 16 out of engagement with the bar 12, so that it may be easily gripped by the hand of the operator, and pulled outwardly to inoperative raised position, and lower the axle 8. It will be seen that when the device is folded as shown in Figure 3, the lever 16 is folded on the member 4 after said member has been folded onto the base 1, and after which the bar 12 is folded onto the lever, after being detached from the base 1, thereby allowing the device to be folded into a compact package, and by securing the lever 16 to the side of the plate it may assume a position to one side of the axle engaging block 7 in engagement with one side of the upwardly and rearwardly extending member 4.

The invention having been set for what is claimed as new and useful is:—

A vehicle jack comprising a horizontally disposed base, an upwardly and rearwardly extending axle engaging member, the lower end of said axle engaging member being curved and having its end pivotally mounted in a bifurcation of the base, an upwardly extending bar, said bar having its lower end pivotally mounted on the rear end of the base, said bar and upwardly and rearwardly extending axle engaging member having their ends pivotally connected at spaced points to a plate, said plate having connected thereto an upwardly and rearwardly extending handle at an angle to the plate, said handle being secured to the plate over the upper end of the upwardly extending bar and adapted to engage the upper end of the upwardly extending bar upon an axle raising operation for limiting the movement of the handle and maintaining the handle out of engagement with the bar, an axle engaging block carried by the upwardly and rearwardly extending member, and disposed in a plane whereby when the handle is folded onto the upwardly and rearwardly extending bar said handle will be disposed to one side of the block.

In testimony whereof I have signed my name to this specification in the presence of two subscribing witnesses.

WILLIAM W. BELLAMY.

Witnesses:
GEORGE MACDONALD,
D. L. SMITH.